(12) United States Patent
Tachibana et al.

(10) Patent No.: US 11,437,066 B2
(45) Date of Patent: Sep. 6, 2022

(54) MAGNETIC RECORDING TAPE AND MAGNETIC RECORDING TAPE CARTRIDGE

(71) Applicant: SONY CORPORATION, Tokyo (JP)

(72) Inventors: Junichi Tachibana, Miyagi (JP); Sogo Oikawa, Miyagi (JP); Koji Suzuki, Miyagi (JP); Teruo Sai, Miyagi (JP); Tomoe Ozaki, Miyagi (JP)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 17/040,611

(22) PCT Filed: Feb. 14, 2019

(86) PCT No.: PCT/JP2019/005201
§ 371 (c)(1),
(2) Date: Sep. 23, 2020

(87) PCT Pub. No.: WO2019/187731
PCT Pub. Date: Oct. 3, 2019

(65) Prior Publication Data
US 2021/0118468 A1 Apr. 22, 2021

(30) Foreign Application Priority Data
Mar. 30, 2018 (JP) .............................. JP2018-069865

(51) Int. Cl.
*G11B 5/73* (2006.01)
*G11B 5/65* (2006.01)
(Continued)

(52) U.S. Cl.
CPC ............ *G11B 5/7369* (2019.05); *G11B 5/656* (2013.01); *G11B 5/658* (2021.05); *G11B 5/78* (2013.01); *G11B 5/667* (2013.01); *G11B 5/7379* (2019.05)

(58) Field of Classification Search
None
See application file for complete search history.

(56) References Cited

U.S. PATENT DOCUMENTS 5,700,593 A * 12/1997 Okumura ............... G11B 5/656
428/831.2
6,767,651 B2 * 7/2004 Uwazumi .............. G11B 5/737
428/831
(Continued)

FOREIGN PATENT DOCUMENTS

EP 3300080 A1 3/2018
JP 2006-012319 A 1/2006
(Continued)

OTHER PUBLICATIONS

International Search Report and Written Opinion of PCT Application No. PCT/JP2019/005201, dated Apr. 23, 2019, 09 pages of ISRWO.

*Primary Examiner* — Kevin M Bernatz
(74) *Attorney, Agent, or Firm* — Chip Law Group

(57) ABSTRACT

To provide a magnetic recording tape and the like that have excellent magnetic properties and exhibit a favorable SNR. There are provided a magnetic recording tape and the like including at least: a base layer that includes a long film having flexibility; and a magnetic layer formed on a side of one main surface of the base layer, in which an under layer and a seed layer are provided in the stated order from a side of the magnetic layer toward a side of the base layer between the magnetic layer and the base layer, the underlayer contains at least Co and Cr, and has an average atomic number ratio represented by the following formula (1): $Co_{(100-y)}Cr_y$, (where y is within a range of $37 \leq y \leq 45$.), and the seed layer formed directly on the base layer has a film thickness of 5 nm or more and 30 nm or less, and contains Ti and O and has an average atomic number ratio represented by the (Continued)

following formula (2): $Ti_{(100-x)}O_x$ (where $x \leq 10$.) or contains Ti—Cr—O and has an average atomic number ratio represented by the following formula (3): $(TiCr)_{(100-x)}O_x$ (where $x \leq 10$.).

11 Claims, 4 Drawing Sheets

(51) Int. Cl.
  *G11B 5/78* (2006.01)
  *G11B 5/667* (2006.01)

(56) References Cited

U.S. PATENT DOCUMENTS

| | | | | |
|---|---|---|---|---|
| 6,777,066 | B1* | 8/2004 | Chang | G11B 5/667 |
| | | | | 428/828 |
| 7,175,925 | B2* | 2/2007 | Chen | G11B 5/667 |
| | | | | 428/831 |
| 7,976,965 | B2* | 7/2011 | Shimizu | G11B 5/66 |
| | | | | 428/828.1 |
| 8,771,849 | B2* | 7/2014 | Nemoto | G11B 5/667 |
| | | | | 428/831 |
| 8,846,219 | B2* | 9/2014 | Hozumi | G11B 5/7369 |
| | | | | 428/831 |
| 9,542,967 | B2* | 1/2017 | Sekiguchi | G11B 5/64 |
| 10,311,908 | B2* | 6/2019 | Aizawa | G11B 5/65 |
| 10,424,329 | B2* | 9/2019 | Tachibana | G11B 5/73927 |
| 10,580,447 | B2* | 3/2020 | Sekiguchi | G11B 5/73935 |
| 2005/0089726 | A1* | 4/2005 | Abarra | G11B 5/7379 |
| | | | | 428/831 |
| 2006/0204791 | A1* | 9/2006 | Sakawaki | G11B 5/65 |
| | | | | 428/828.1 |
| 2009/0081483 | A1* | 3/2009 | Sonobe | G11B 5/66 |
| | | | | 428/828 |
| 2009/0195924 | A1 | 8/2009 | Nemoto et al. | |
| 2010/0007988 | A1* | 1/2010 | Igarashi | G11B 5/65 |
| | | | | 360/122 |
| 2010/0196741 | A1* | 8/2010 | Sonobe | G11B 5/667 |
| | | | | 427/131 |
| 2012/0021254 | A1 | 1/2012 | Kuboki | |
| 2013/0209836 | A1* | 8/2013 | Ataka | G11B 5/851 |
| | | | | 428/831 |
| 2014/0329112 | A1* | 11/2014 | Aizawa | G11B 5/7369 |
| | | | | 428/831.2 |
| 2014/0342189 | A1* | 11/2014 | Tachibana | G11B 5/7379 |
| | | | | 428/831 |
| 2014/0363700 | A1* | 12/2014 | Tachibana | G11B 5/64 |
| | | | | 428/831 |
| 2017/0194026 | A1* | 7/2017 | Kimura | G11B 5/667 |
| 2017/0221513 | A1 | 8/2017 | Hiroi et al. | |
| 2018/0137887 | A1 | 5/2018 | Sekiguchi et al. | |

FOREIGN PATENT DOCUMENTS

| | | |
|---|---|---|
| JP | 2008-192295 A | 8/2008 |
| JP | 2009-116930 A | 5/2009 |
| JP | 2012-027989 A | 2/2012 |
| JP | 2012-109020 A | 6/2012 |
| JP | 2017-191633 A | 10/2017 |
| WO | 2016/185695 A1 | 11/2016 |

* cited by examiner

MAGNETIC RECORDING TAPE AND MAGNETIC RECORDING TAPE CARTRIDGE

CROSS REFERENCE TO RELATED APPLICATIONS

This application is a U.S. National Phase of International Patent Application No. PCT/JP2019/005201 filed on Feb. 14, 2019, which claims priority benefit of Japanese Patent Application No. JP 2018-069865 filed in the Japan Patent Office on Mar. 30, 2018. Each of the above-referenced applications is hereby incorporated herein by reference in its entirety.

TECHNICAL FIELD

The present technology relates to a magnetic recording tape and the like. More specifically, the present technology relates to a magnetic recording tape that has favorable crystal orientation and includes a magnetic film having a high coercive force, and a magnetic recording tape cartridge housing the magnetic recording tape.

BACKGROUND ART

Examples of typical magnetic recording media include a magnetic recording tape and a hard disk medium. In recent years, the former, i.e., the magnetic recording tape has attracted attention again for data upload. This is because the spread of the Internet, cloud computing, and accumulation and analysis of big data are progressing, which explosively increases the amount of information to be recorded for a long time, and the magnetic recording medium is desired to have a higher recording capacity. Further, this magnetic recording tape has advantages in terms of cost, energy saving, long lifetime, reliability, and the like.

This magnetic recording tape has a multi-layer structure in which a magnetic layer and other layers are stacked on a base layer including a long flexible film unlike a hard disk medium including a glass substrate or the like as a substrate. In this magnetic recording tape, one of the important technical problems is to further improve the crystal orientation characteristics of a magnetic layer provided on the surface layer of the magnetic recording tape. The crystal orientation characteristics of the magnetic layer are affected not only by the composition of the magnetic particle material of the magnetic layer but also by the configuration of an under layer interposed between the magnetic layer and the base layer, or the like, and affects the signal-to-noise ratio (hereinafter, SNR) of the magnetic recording tape.

For example, Patent Literature 1 discloses a technology of forming a Ru (ruthenium) layer as a lower layer of the magnetic layer that contains an Si oxide and mainly contains Co—Pt—Cr. In this technology, focusing on the fact that Ru has a hexagonal close-packed structure as in Co (cobalt) and Ru has a lattice constant close to that of Co, the crystal orientation of the Ru layer has been devised to enhance the crystal orientation characteristics of the magnetic layer and achieve a high coercive force.

CITATION LIST

Patent Literature

Patent Literature 1: Japanese Patent Application Laid-open No. 2006-12319

DISCLOSURE OF INVENTION

Technical Problem

The main object of the present technology is to provide a magnetic recording tape that has favorable crystal orientation characteristics and exhibits a high SNR by devising a novel configuration of an underlayer.

Solution to Problem

The present inventors provide a magnetic recording tape and the like including at least: a base layer that includes a long film having flexibility; and a magnetic layer formed on a side of one main surface of the base layer, in which an under layer and a seed layer are provided in the stated order from a side of the magnetic layer toward a side of the base layer between the magnetic layer and the base layer, the underlayer contains at least Co and Cr, and has an average atomic number ratio represented by the following formula (1): $Co_{(100-y)}Cr_y$ (where y is within a range of $37 \leq y \leq 45$.), and the seed layer formed on the base layer has a film thickness of 5 nm or more and 20 nm or less, and contains Ti and O and has an average atomic number ratio represented by the following formula (2): $Ti_{(100-x)}O_x$ (where $x \leq 10$.) or contains Ti—Cr—O and has an average atomic number ratio represented by the following formula (3): $(TiCr)_{(100-x)}O_x$ (where $x \leq 10$.).

Advantageous Effects of Invention

The magnetic recording tape according to the present technology has favorable crystal orientation characteristics and is capable of exhibiting a high SNR.

MODE(S) FOR CARRYING OUT THE INVENTION

Hereinafter, favorable embodiment examples for carrying out the present technology will be described with reference to the accompanying drawings. Note that since the embodiment examples described below exemplify embodiments suitable for the present technology or alternatives thereof, the present disclosure is not narrowly limited to these embodiment examples and various modifications can be made on the basis of the technical idea of the present disclosure. For example, the configurations, the methods, the steps, the shapes, the materials, and the numerical values cited in the following embodiment examples and modified examples thereof are only illustrative, and different configurations, methods, steps, shapes, materials, and numerical values may be used as necessary. In addition, the chemical formulae of compounds and the like are, if present, representative ones, and the valences and the like are not limited as long as they represent common names of the same compound. Also, the configurations, the methods, the steps, the shapes, the materials, and the numerical values in the embodiment examples described below and the modified examples thereof can be combined without departing from the essence of the present technology. Description will be made in the following order.

(1) Layer configuration of magnetic recording tape according to present technology
   (1-1) First embodiment example
   (1-2) Second embodiment example
   (1-3) Third embodiment example
   (1-4) Fourth embodiment example
   (1-5) Fifth embodiment example
   (1-6) Sixth embodiment example
(2) Embodiment example of magnetic recording tape cartridge according to present technology
(3) Example of method of producing magnetic recording tape according to present technology (1) Layer Configuration of Magnetic Recording Tape According to Present Technology For the layer configuration of a magnetic recording tape according to the present technology, for example, the following first to sixth embodiment examples can be adopted.

(1-1) First Embodiment Example

Figure 1:
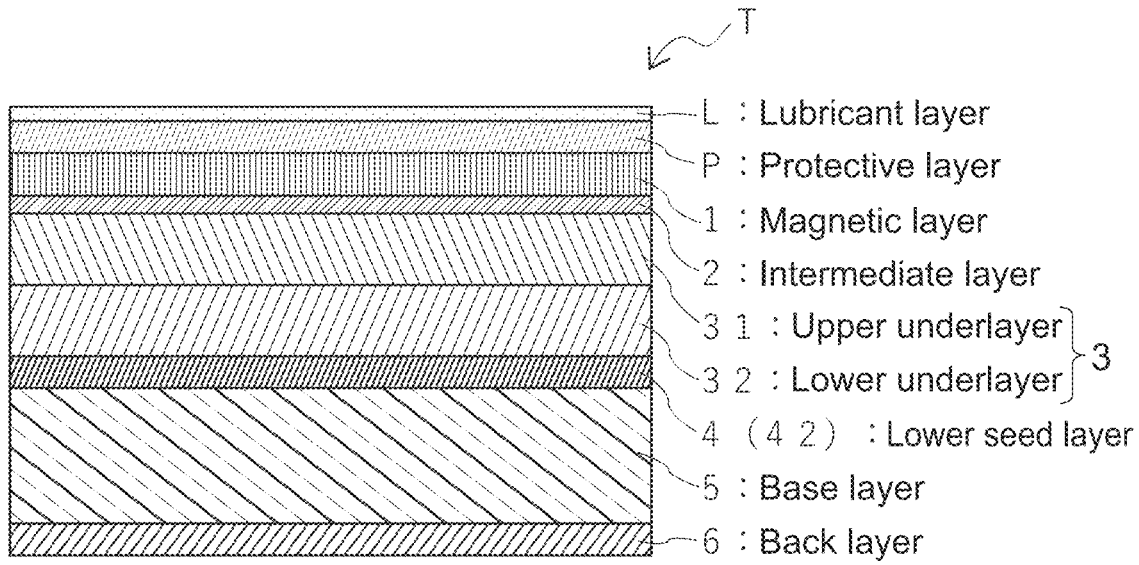
FIG. 1 is a diagram showing a basic layer structure of a first embodiment example.

FIG. 1 is a cross-sectional view showing the layer structure of a magnetic recording tape T according to a first embodiment example of the present technology. In this magnetic recording tape T, a seed layer 4 is provided on one main surface of a base layer 5, underlayers 31 and 22 having a two-layer structure are sequentially stacked immediately on the seed layer 4 having a single-layer structure, an intermediate layer 2 is provided on the underlayer 32, a magnetic layer 1 that functions as a magnetic recording layer is provided on the intermediate layer 2, a protective layer P is provided on the magnetic layer 1, and a lubricant layer L is provided thereon. Then, a back layer 6 is provided on the other main surface of the base layer 5. Note that this layer configuration in the first embodiment example corresponds to the layer configuration in Examples 1 to 14 described below. Hereinafter, the configuration of each layer will be described in the order from the magnetic layer 1 to the base layer 5, and the back layer 6 as the lowermost layer will be described finally. Further, in the description of the present technology, assumption is made that the side of the magnetic layer 1 and the side of the back layer 6 with the base layer 5 sandwiched therebetween are respectively the upper side and the lower side. The layers common to all the embodiment examples according to the present technology will be denoted by the same reference symbols in all the accompanying drawings, and duplicate description of the configuration, material, and the like relating to the common layers will be omitted.

<Magnetic Layer 1>

The magnetic layer 1 is a layer containing magnetic crystal grains, and functions as layer that records or reproduces a signal by using magnetism. It is favorable that the magnetic crystal grains are perpendicularly oriented in the magnetic layer 1 from the viewpoint of being capable of improving the recording density. Further, from this viewpoint, it is favorable that the magnetic layer 1 is a layer that has a granular structure containing a Co alloy.

The magnetic layer 1 having a granular structure is formed of ferromagnetic crystal grains containing a Co alloy, and non-magnetic grain boundaries (non-magnetic material) surrounding the ferromagnetic crystal grains. More specifically, the magnetic layer 1 having a granular structure is formed of columns (columnar crystals) containing a Co alloy, and non-magnetic grain boundaries that surround the columns and separate the respective columns physical and magnetically. Due to such a granular structure, the magnetic layer 1 has a structure in which the columnar magnetic crystal grains are magnetically separated from each other.

The Co alloy has a hexagonal close-packed (hcp) structure as in Ru of the above-mentioned intermediate layer 2, and the c-axis is oriented in the direction perpendicular to the film surface (in the thickness direction of the magnetic recording tape). As described above, the magnetic layer 1 has a hexagonal close-packed structure as in the intermediate layer 2 immediately below, which further improves the orientation characteristics of the magnetic layer 1. As the Co alloy, it is favorable to adopt a CoCrPt alloy containing at least Co, Cr, and Pt. The CoCrPt alloy is not particularly narrowly limited, and may further contain an additional element. Examples of the additional element include one or more types of elements selected from Ni, Ta, and the like. Favorably, the magnetic layer 1 can have a granular structure in which particles containing Co, Pt, and Cr are separated by an oxide.

The non-magnetic grain boundaries surrounding the ferromagnetic crystal grains contain a non-magnetic metal material. Here, the metal includes semi-metals. As the non-magnetic metal material, for example, at least one of a metal oxide or a metal nitride can be adopted. From the viewpoint of maintaining the above-mentioned granular structure more stably, it is favorable to use a metal oxide.

Examples of the above-mentioned metal oxide suitable for the non-magnetic grain boundaries include a metal oxide containing at least one element selected from the group consisting of Si, Cr, Cr, Al, Ti, Ta, Zr, Ce, Y, B, Hf, and the like. Specific examples thereof include $SiO_2$, $Cr_2O_3$, CuO, $Al_2O_3$, $TiO_2$, $Ta_2O_5$, $ZrO_2$, $B_2O_3$, and $HfO_2$. In particular, a metal oxide containing $SiO_2$ or $TiO_2$ is favorable.

Examples of the above-mentioned metal nitride suitable for the non-magnetic grain boundaries include a metal nitride containing at least one element selected from the group consisting of Si, Cr, Co, Al, Ti, Ta, Zr, Ce, Y, Hf, and the like. Specific examples thereof include SiN, TiN, and AlN.

Further, it is favorable that the CoCrPt alloy contained in the ferromagnetic crystal grains and $SiO_2$ or $TiO_2$ contained in the non-magnetic grain boundaries have an average atomic number ratio represented by the following formula (4). This is because it is possible to supper the influence of the demagnetizing field realize a saturation magnetization amount Ms capable of ensuring a sufficient reproduction output, thereby further improving the recording/reproduction characteristics.

$$(Co_xPT_yCr_{100-x-y})_{100-z}\text{---}(MO_2)_z \quad (4)$$

(However, in the formula (4), x, y, and z are each a value within the ranges of $69 \leq x \leq 72$, $10 \leq y \leq 16$, and $9 \leq z \leq 12$, and M represents Si or Ti.)

The above-mentioned average atomic number ratio can be obtained as follows. Depth direction analysis (depth file measurement) is performed on the magnetic layer 1 by an Auger electron spectroscopy (hereinafter, referred to as "AES".) while ion milling from the side of a protective layer1 (see FIG. 1. Described below) of the magnetic recording tape T to obtain the average atomic number ratio of each of Co, Pt, Cr, Si, and O in the film thickness direction.

The favorable range of the thickness of the magnetic layer 1 is 10 nm to 20 nm. The lower limit thickness of 10 nm means the limit thickness from the viewpoint of the effect of thermal disturbance due to the reduction of the volume of the magnetic particles. The thickness exceeding the upper limit thickness of 20 nm is a problem from the viewpoint of setting the bit length of the magnetic recording tape having a high recording density.

The average thickness of the magnetic layer 1 can be obtained as follows. First, the magnetic recording tape T is thinly processed perpendicularly to the main surface thereof to prepare a sample piece, and the cross section of the sample piece is observed by a transmission electron microscope (TEM). The device and observation conditions are as follows: device: TEM (H9000NAR manufactured by Hitachi, Ltd.), acceleration voltage: 300 kV, and magnification: 100,000. Next, using the obtained TEM image, the thickness of the magnetic layer 1 is measured at at least 10 points in the longitudinal direction of the magnetic recording tape T, and then, the measured values are simply averaged (arithmetic average) to obtain the average thickness of the magnetic layer 1. Note that the measurement positions are randomly selected from the sample piece.

<Protective Layer>

Note that the reference symbol P in FIG. 1 and the like indicates a protective layer. This protective layer P is a layer that plays a role of protecting the magnetic layer 1. This protective layer P contains, for example, a carbon material or silicon dioxide ($SiO_2$). From the viewpoint of the film strength of this protective layer 1, the protective layer P favorably contains a carbon material. Examples of the carbon material include graphite, diamond-like carbon (abbreviated as DLC), and diamond. Note that the protective layer 5 is common to all the following embodiment examples.

<Lubricant Layer>

The lubricant layer L may be provided as the upper layer of this protective layer P (see FIG. 1). This lubricant layer L is a layer in which a lubricant is mixed, and mainly plays a role of reducing friction of the magnetic recording tape T during travelling.

The lubricant layer L contains at least one type of lubricant. The lubricant layer L may further contain, as necessary, various additives, e.g., a rust inhibitor. The lubricant has at least two carboxyl groups and one ester bond, and contains at least one type of carboxylic acid compound represented by the following general chemical formula (1). The lubricant may further contain a lubricant other than the carboxylic acid compound represented by the following general chemical formula (1).

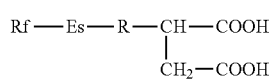
(Chem. 1)

(In the formula, Rf represents an unsubstituted or substituted, saturated or unsaturated fluorine-containing hydrocarbon group or hydrocarbon group, Es represents an ester bond, and R, which may be absent, represents unsubstituted or substituted, saturated or unsaturated hydrocarbon group.)

The above-mentioned carboxylic acid compound is favorably one represented by the following general chemical formula (2) or general chemical formula (3).

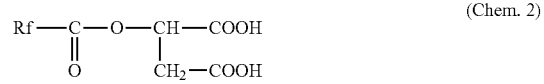
(Chem. 2)

(In the formula, Rf represents an unsubstituted or substituted, saturated or unsaturated fluorine-containing hydrocarbon group or hydrocarbon group.)

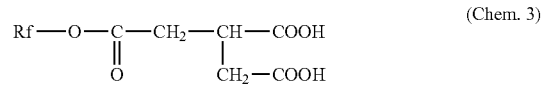
(Chem. 3)

(In the formula, Rf represents an unsubstituted or substituted, saturated or unsaturated fluorine-containing hydrocarbon group or hydrocarbon group.)

It is favorable that the lubricant contains one or both of the above-mentioned carboxylic acid compounds represented by the general chemical formula (2) and the general chemical formula (3).

In the case where the lubricant containing the carboxylic acid compound represented by the general chemical formula (1) is applied to the magnetic layer 1, the protective layer P, or the like, a lubricating action is exerted by the cohesive force between the fluorine-containing hydrocarbon group or the hydrocarbon group Rf, which is a hydrophobic group. In the case where the Rf group is a fluorine-containing hydrocarbon group, it is favorable that the total number of carbons is 6 to 50 and the total number of fluorohydrocarbon groups is 4 to 20. The Rf group may be saturated or unsaturated, linear or branched, or cyclic, but is favorably saturated and linear.

For example, in the case where the Rf group is a hydrocarbon group, the group represented by the following general chemical formula (4) is favorable.

(Chem. 4)

(However, in the general chemical formula (4), 1 represents an integer selected from the range of 8 to 30 and more favorably the range of 12 to 20.)

Further, in the case where the Rf group is a fluorine-containing hydrocarbon group, the group represented by the following general chemical formula (5) is favorable.

(Chem. 5)

(However, in the general chemical formula (5), m and n each represent an integer selected from the following ranges: m=2 to 20, n=3 to 18, more favorably, m=4 to 13, n=3 to 10.)

The fluorohydrocarbon group may be concentrated in one place as described above or dispersed as in the following general chemical formula (6), and may be not only —CF$_3$ or —CF$_2$— but also —CHF$_2$, —CHF—, or the like.

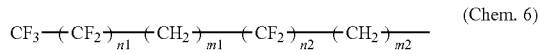
(Chem. 6)

(However, in the general chemical formula (6), n1+n2=n, m1+m2=m.)

The carbon number is limited as described above in the general chemical formulae (4), (5), and (6) because the length becomes an appropriate length, the cohesive force between the hydrophobic groups is effective exerted, a favorable lubricating action is exhibited, and the friction/wear durability is improved in the case where the carbon number (l or sum of m and n) constituting an alkyl group or a fluorine-containing alkyl group is the above-mentioned lower limit or more. Further, in the case where the carbon number is the above-mentioned upper limit or less, the favorable solubility of the lubricant formed of the above-mentioned carboxylic acid compound in a solvent is kept.

In particular, in the case where the Rf group contains a fluorine atom, it is effective in reducing the friction coefficient and improving the travelling property. However, it is favorable to provide a hydrocarbon group between the fluorine-containing hydrocarbon group and the ester bond to separate the fluorine-containing hydrocarbon group and the ester bond from each other, and ensure high stability of the ester bond to suppress hydrolysis. Further, the Rf group may have a fluoroalkyl ether group or a perfluoropolyether group. The R group may be absent, but may be, if present, a hydrocarbon chain having a relatively low carbon number. Further, the Rf group or the R group contains, as constituent element, an element such as nitrogen, oxygen, sulfur, phosphorus, and halogen, and may further contain, in addition to the above-mentioned functional group, a hydroxyl group, a carboxyl group, a carbonyl group, an amino group, an ester bond, and the like.

Specifically, the carboxylic acid compound represented by the above-mentioned general chemical formula (1) is favorably at least one of the following compounds. That is, the lubricant favorably contains at least one of the following compounds. CF$_3$ (CF$_2$)$_7$ (CH$_2$)$_{10}$COOCH(COOH) CH$_2$COOH CF$_3$ (CF$_2$)$_3$ (CH$_2$)$_{10}$COOCH(COOH) CH$_2$COOH C$_{17}$H$_{35}$COOCH(COOH) CH$_2$COOH CF$_3$ (CF$_2$)$_7$ (CH$_2$)$_2$OCOCH$_2$CH(C$_{18}$H$_{37}$) COOCH(COOH) CH$_2$COOH CF$_3$ (CF$_2$)$_7$COOCH(COOH) CH$_2$COOH CHF$_2$ (CF$_2$)$_7$COOCH(COOH) CH$_2$COOH CF$_3$ (CF$_2$)$_7$ (CH$_2$)$_2$ OCOCH$_2$CH(COOH) CH$_2$COOH CF$_3$ (CF$_2$)$_7$ (CH$_2$)$_6$ OCOCH$_2$CH(COOH) CH$_2$COOH CF$_3$ (CF$_2$)$_7$ (CH$_2$)$_{11}$ OCOCH$_2$CH(COOH) CH$_2$COOH CF$_3$ (CF$_2$)$_3$ (CH$_2$)$_6$ OCOCH$_2$CH(COOH) CH$_2$COOH C$_{12}$H$_{37}$OCOCH$_2$CH (COOH) CH$_2$COOH CF$_3$ (CF$_2$)$_7$ (CH$_2$)$_4$COOCH(COOH) CH$_2$COOH CF$_3$ (CF$_2$)$_3$ (CH$_2$)$_4$COOCH(COOH) CH$_2$COOH CF$_3$ (CF$_2$)$_3$ (CH$_2$)$_7$COOCH(COOH) CH$_2$COOH CF$_3$ (CF$_2$)$_9$ (CH$_2$)$_{10}$COOCH(COOH) CH$_2$COOH CF$_3$ (CF$_2$)$_7$ (CH$_2$)$_{12}$COOCH(COOH) CH$_2$COOH CF$_3$ (CF$_2$)$_5$ (CH$_2$)$_{10}$COOCH(COOH) CH$_2$COOH CF$_3$ (CF$_2$) BCH(C$_9$H$_{19}$) CH$_2$CH=CH(CH$_2$)$_7$ COOCH(COOH) CH$_2$COOH CF$_3$ (CF$_2$) BCH(C$_6$H$_{13}$) (CH$_2$)$_7$COOCH(COOH) CH$_2$COOH CH$_3$ (CH$_2$)$_3$ (CH$_2$CH$_2$CH(CH$_2$CH$_2$ (CF$_2$)$_9$CF$_3$))$_2$ (CH$_2$)$_7$COOCH (COOH) CH$_2$COOH The above-mentioned carboxylic acid compound represented by the general chemical formula (1) is soluble in a non-fluorine solvent that has a low impact on the environment, and has an advantage that operations such as coating, dripping, and spraying can be performed using a general-purpose solvent such as a hydrocarbon solvent, a ketone solvent, an alcohol solvent, and an ester solvent. Specific examples of such a solvent include hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, and cyclohexanone.

In the case where the protective layer P contains a carbon material, when the above-mentioned carboxylic acid compound is applied as a lubricant onto the protective layer P, two carboxyl groups that are polar groups of the lubricant molecule and at least one ester bond group are adsorbed on the protective layer P and the lubricant layer L having particularly favorable durability can be formed by the cohesive force between the hydrophobic groups.

Note that the lubricant does not necessarily need to be retained as the lubricant layer L on the surface of the magnetic recording tape T as described above, and may be contained and retained in the layer such as the magnetic layer 1 and the protective layer P constituting the magnetic recording tape T.

<Intermediate Layer>

The intermediate layer indicated by the reference symbol 2 in FIG. 1 and the like is a layer that mainly plays a role of improving the orientation characteristics of the above-mentioned magnetic layer 1 formed immediately on the intermediate layer 2. This intermediate layer 2 favorably has a crystal structure similar to that of the main component of the magnetic layer 1 in contact with the intermediate layer 2. For example, in the case where the magnetic layer 1 contains a Co (cobalt) alloy, it is favorable that the intermediate layer 2 contains a material having a hexagonal close-packed structure similar to that of this Co alloy and the c-axis of the structure is oriented in the direction perpendicularly to the film surface (in the thickness direction of the magnetic recording tape). As a result, it is possible to further improve the crystal orientation characteristics of the magnetic layer 1 and make the matching of the lattice constant between the intermediate layer 2 and the magnetic layer 1 relatively favorable.

As the material having a hexagonal close-packed structure adopted in the intermediate layer 2, Ru (ruthenium) alone or an alloy thereof is favorable. Examples of the Ru alloy include a Ru alloy oxide such as Ru—SiO$_2$, RuTiO$_2$, and Ru—ZrO$_2$. However, the Ru material is a rare metal, it is favorable to make the intermediate layer 2 thin as possible from the viewpoint of cost, and the thickness is favorably 6.0 nm or less, more favorably 5.0 nm or less, and still more favorably 2.0 nm or less. Alternatively, from the viewpoint of cost, it is more favorable to adopt a configuration in which the intermediate layer 2 is completely eliminated (e.g., the second embodiment example in FIG. 2 or the fourth embodiment example in FIG. 4).

In this first embodiment example, since the underlayer 3 and the seed layer 4, which will be described below, are provided on the base layer 5, it is possible to obtain a magnetic recording tape having a favorable SNR even in the case where the thickness of the intermediate layer 2 is made thin or a layer form (second embodiment example, see FIG. 2. Described below.) in which the intermediate layer 2 is absent is adopted.

Note that when the "wettability" of the intermediate layer 2 is utilized, the material forming the magnetic layer 1 formed by vacuum deposition on the intermediate layer 2 is easily diffused when crystalized, and it is possible to increase the column size of the crystal. For example, in order to make the intermediate layer 2 containing Ru exhibit the wettability, a thickness of at least 0.5 nm is required.

<Underlayer>

In the first embodiment example shown in FIG. 1, the underlayer 3 is provided immediately below the above-mentioned intermediate layer 2. The underlayer 3 contains at least Co and Cr, and has an average atomic number ratio represented by the following formula (1).

$$Co_{(100-y)}Cr_y \quad (1)$$

(where y is within a range of 37≤y≤45.)

In accordance with a favorable embodiment of the present technology, the underlayer 3 can further contain a metal oxide. The metal oxide can be favorably silicon dioxide (SiO$_2$) or titanium dioxide (TiO$_2$). In this embodiment, the composition of the underlayer 3 may be, for example, as follows.

$$[Co_{(100-y)}Cr_y]_{(100-z)}(MO_2)_z \quad (5)$$

(where, y and z are within the ranges of 37≤y≤45 and z≤10, and M represents Si or Ti.)

In accordance with one embodiment of the present technology, the upper underlayer 31 may be provided below the intermediate layer 2, and the lower underlayer 32 may be provided immediately below the upper underlayer 31. That is, the underlayer 3 in this first embodiment example may have a two-layer structure including the upper underlayer 31 and the lower underlayer 32.

As described above, the underlayer 3 may be formed of a Co alloy. Also in the case where the underlayer 3 has the above-mentioned two-layer structure, it is favorable that both the upper underlayer 31 and the lower underlayer 32 are each formed of a Co alloy similar to that of the magnetic layer 1 (described below) formed of the Co alloy. This is because the underlayer 3 has, in the case where a Co alloy is used for the underlayer 3, a crystal structure having a hexagonal close-packed (hcp) structure as in the magnetic layer 1 or the intermediate layer 2 described above, and the c-axis is oriented in the direction perpendicular to the film surface (in the thickness direction of the magnetic recording tape). The underlayer 3 has a hexagonal close-packed structure as in the magnetic layer 1 or the intermediate layer 2 as described above, making it possible to further improve the orientation characteristics of the magnetic layer 1.

In the case where the underlayer 3 has the above-mentioned two-layer structure, the upper underlayer 31 constituting the underlayer 3 favorably has the average atomic number ratio represented by the following formula (1).

$$Co_{(100-y)}Cr_y \quad (1)$$

(where y is within the range of 37≤y≤45.)

The CoCr film constituting the underlayer 3 has a hcp phase when 0≤y≤36 and a σ phase when 54≤y≤66. In the case where the CoCr film is in the coexistence state of the hcp phase and the σ phase, a film having a favorable c-ais orientation in the perpendicular orientation and an isolated column shape is formed in a metal film that grows thereon and has a hexagonal close-packed structure. In the case where y is less than 37, the CoCr film has only a hcp phase, which is unsuitable because the isolation of the column of the metal film that grows thereon is reduced. Meanwhile, in the case where y exceeds 45, the ratio of the σ phase in the CoCr film increases, which is unsuitable because the c-axis orientation of the metal film that grows thereon is reduced.

The upper underlayer 31 may contain silicon dioxide (SiO$_2$) or titanium dioxide (TiO$_2$) within the range shown in the average atomic number ratio represented by the following formula (5).

$$[Co_{(100-y)}Cr_y]_{(100-z)}(MO_2)_z \quad (5)$$

(However, y and z are within the ranges of 37≤y≤45 and z≤10, and M represents Si or Ti.)

In the case where z exceeds 10 in the above-mentioned formula (5) regarding the underlayer 3 and the upper underlayer 31, the magnetic columnar crystals (columns) of a Co alloy and the non-magnetic grain boundaries that surround the columns and separate the respective columns physically and magnetically are excessive, which is not favorable because the respective columnar magnetic crystal grains have a magnetically excessively separated structure. Note that in the case where Z=0 in this formula (5), the formula (1) is applied.

The upper underlayer 31 can further contain a metal oxide. The metal oxide can constitute the non-magnetic grain boundaries. Examples of the metal oxide include, in addition to SiO$_2$, a metal oxide containing at least one or more elements selected from the group consisting of Cr, Cr, Al, Ti, Ta, Zr, Ce, Y, B, Hf, and the like. Specific examples thereof include Cr$_2$O$_3$, CuO, Al$_2$O$_3$, TiO$_2$, Ta$_2$O$_5$, ZrO$_2$, B$_2$O$_3$, and HfO$_2$. In particular, a metal oxide containing SiO$_2$ or TiO$_2$ is favorable.

The thickness of this upper underlayer 31 is favorably within the range of 20 to 50 nm. In the case where the thickness is less than 20 nm, it is difficult to obtain the mountain shape at the head of the column, which is the key to the granular shape, and sufficient granularity of the intermediate layer that grows thereon cannot be ensured. Further, in the case where the thickness exceeds 50 nm, the columns size of the intermediate layer increases due to the coarsening of the column, and thus, the column size of the magnetic layer increases finally, thereby increasing the noise of the recording/reproduction characteristics.

Next, the above description of the upper underlayer 31 is applicable also to the lower underlayer 31 provided immediately below the upper underlayer 31. For example, it is favorable that the lower underlayer 31 has a composition including at least Co and Cr and has the same average atomic number ratio as that represented by the above-mentioned formula (1) or (5). The favorable range of the thickness of the lower underlayer 31 is similar to that of the above-mentioned upper underlayer 31.

In the case where a two-layer structure in which the upper underlayer 31 and the lower underlayer 32 are provided in the underlayer 3 is adopted as in this first embodiment example, by setting the deposition condition for increasing the crystal orientation in the lower underlayer 32 and setting the deposition condition for achieving high granularity in the upper underlayer 31, the crystal orientation and the granularity can be realized at the same time, which is favorable.

<Seed Layer>

The seed layer indicated by the reference symbol 4 in FIG. 1 and the like is a layer that is located below the underlayer 3 and is formed immediately on one main surface of the base layer 5 (described below). This seed layer 4 is necessary to ensure a favorable SNR (signal-to-noise ratio) even in the case where the intermediate layer 2 described below is thinly formed or in the case of a layer configuration in which the intermediate layer 2 is not provided. Further, this seed layer 4 also plays a role of adhering the underlayer 3 and the upper layers thereof, i.e., the underlayer 3 (31, 32), the intermediate layer 2, and the magnetic layer 1, to the base layer 5.

This seed layer 4 contains at least two atoms of Ti (titanium) and O (oxygen), and favorably has the average atomic number ratio represented by the following formula (2).

$$Ti_{(100-x)}O_x \qquad (2)$$

(where x≤10.)

Alternatively, this seed layer 4 contains three atoms of Ti, Cr, and O, and favorably has the average atomic number ratio represented by the following formula (3). It is favorable that the seed layer 4 contains Cr because the matching with the underlayer 3 (31, 32) or the magnetic layer 1, which also contains Cr, is improved.

$$(TiCr)_{(100-x)}O_x \qquad (3)$$

(where x≤10.)

In any of the average atomic number ratios represented by the above-mentioned formula (2) and (3), when X exceeds 10 in both the formulae, $TiO_2$ crystals are generated in the seed layer, which is not favorable because the function as an amorphous film is significantly deteriorated.

Since Ti contained in the seed layer 4 has a hexagonal close-packed structure as in a Co alloy, the matching with the crystal structure of the magnetic layer 1, the intermediate layer 2, the underlayer 3 is favorable.

The seed layer 4 contains oxygen. This is because oxygen derived from or originating from the film constituting the base layer 5 described below enters the seed layer 4, which achieves an atomic configuration different from that of the seed layer of a hard disk (HDD) that does not use the base layer 5 including a film. Note that the thickness of the entire seed layer 4 is favorably 5 nm and more and 30 nm or less.

<Base Layer>

The base layer 5 indicated by the reference symbol 5 in FIG. 1 and the like is a long non-magnetic support having flexibility, and mainly functions as a base layer of the magnetic recording tape. The base layer 5 is referred to as the base film layer or substrate in some cases, and is a film layer that imparts appropriate rigidity to the entire magnetic recording tape T.

The upper limit of the average thickness of the base layer 5 is less than 4.5 μm, more favorably 4.2 μm or less, more favorably 3.6 μm or less, and still more favorably 3.3 μm or less. In the case where the upper limit of the average thickness of the base layer 5 is 3.6 μm or less, it is possible to increase the recording capacity in one data cartridge as compared with a general magnetic recording medium. Note that the thickness of the lower limit of the base layer 5 is determined from the viewpoint of the limit of the film deposition and the function of the base layer 5.

The average thickness of the base layer 5 can be obtained as follows. First, the magnetic recording tape T1 having a ½ inch width is prepared and cut into a length of 250 mm to prepare a sample. Subsequently, the layers other than the base layer 5 of the sample are removed with a solvent such as MEK (methyl ethyl ketone) and dilute hydrochloric acid. Next, the thickness of the sample (base layer 5) is measured at five or more points using a laser hologage manufactured by Mitsutoyo by as a measuring device, and the measured values are simply averaged (arithmetic average) to calculate the average thickness of the base layer 5. Note that the measurement positions are randomly selected from the sample.

The base layer 5 contains, for example, at least one of polyesters, polyolefins, cellulose derivatives, vinyl resins, or different polymer resins. In the case where the base layer 5 contains two or more of the above-mentioned materials, the two or more materials may be mixed, copolymerized, or stacked. The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate. The polyolefins include, for example, at least one of PE (polyethylene) or PP (polypropylene). The cellulose derivatives includes, for example, at least one of cellulose diacetate, cellulose triacetate, CAB (cellulose acetate butyrate), or CAP (cellulose acetate propionate). The vinyl resins include, for example, at least one of PVC (polyvinyl chloride) or PVDC (polyvinylidene chloride). The different polymer resins include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyether ester, PES (polyethersulfone), PEI (polyether imide), PSF (polysulfone), PPS (polyphenylene sulfide), PC (polycarbonate), PAR (polyarylate), or PU (polyurethane).

The material of this base layer 5 is not particularly narrowly limited, but is determined by the standard of the magnetic recording tape in some cases. For example, PEN is specified in the LTO standard. Note that the base layer 5 is common to all the following embodiment examples.

<Back Layer>

As shown in FIG. 1 and the like, the back layer 6 is formed on the lower main surface of the base layer 5. This back layer 6 has a role of controlling friction generated when the magnetic recording tape T1 travels at high speed while facing a magnetic head, a role of suppressing winding disorder, and other roles. That is, the back layer 6 plays a basic role of causing the magnetic recording tape T1 to stably travel at high speed. This back layer 6 is common to all the following embodiment examples.

The back layer 6 contains a binder and a non-magnetic powder. The back layer 6 may further contain at least one type of additive selected from the group consisting of a lubricant, a curing agent, an antistatic agent, and the like, as necessary. The binder and the non-magnetic powder are similar to those in the case of the above-mentioned non-magnetic layer 2. By adding an antistatic agent, it is possible to prevent dust and dirt from adhering to the back layer 6.

The average particle size of the non-magnetic powder that can be contained in the back layer 6 is favorably 10 nm and more and 150 nm or less and more favorably 15 nm or more and 110 nm or less. The average particle size of the non-magnetic powder is obtained in a way similar to that for the average particle size of the above-mentioned magnetic particle. The non-magnetic powder may include a non-magnetic powder having two or more particle size distributions.

The upper limit of the average thickness of the back layer 6 is favorably 0.6 μm or less. In the case where the upper limit of the average thickness of the back layer 6 is 0.6 μm or less, it is possible to maintain the travelling stability of the magnetic recording tape T in a recording/reproduction apparatus even when the average thickness of the magnetic recording tape T is 5.6 μm or less. The lower limit of the average thickness of the back layer 6 is not particularly limited, but is, for example, 0.2 μm or more. In the case where the average thickness of the back layer 6 is less than 0.2 μm, there is a possibility that the travelling stability of the magnetic recording tape T in the reproduction apparatus is impaired.

The average thickness of the back layer 6 is obtained as follows. First, the magnetic recording tape T having a ½ inch width is prepared and cut into a length of 250 mm to prepare a sample. Next, the thickness of the sample is measured at five or more points using a laser hologage manufactured by Mitsutoyo by as a measuring device, and the measured values are simply averaged (arithmetic average) to calculated an average value $t_T$ [μm] of the magnetic recording tape T. Note that the measurement positions are randomly selected from the sample.

Subsequently, the back layer 6 of the sample is removed with a solvent such as MEK (methyl ethyl ketone) and dilute hydrochloric acid. After that, the thickness of the sample is measured at five or more points using the above-mentioned laser hologage again, and the measured values are simply averaged (arithmetic average) to calculate an average value $t_B$ [μm] of the magnetic recording tape T from which the back layer 6 has been removed. Note that the measurement positions are randomly selected from the sample. After that, an average thickness $t_b$ [μm] of the back layer 6 can be obtained on the basis of the formula of $t_b[μm]=t_T[μm]-t_B[μm]$.

(1-2) Second Embodiment Example

Figure 2:
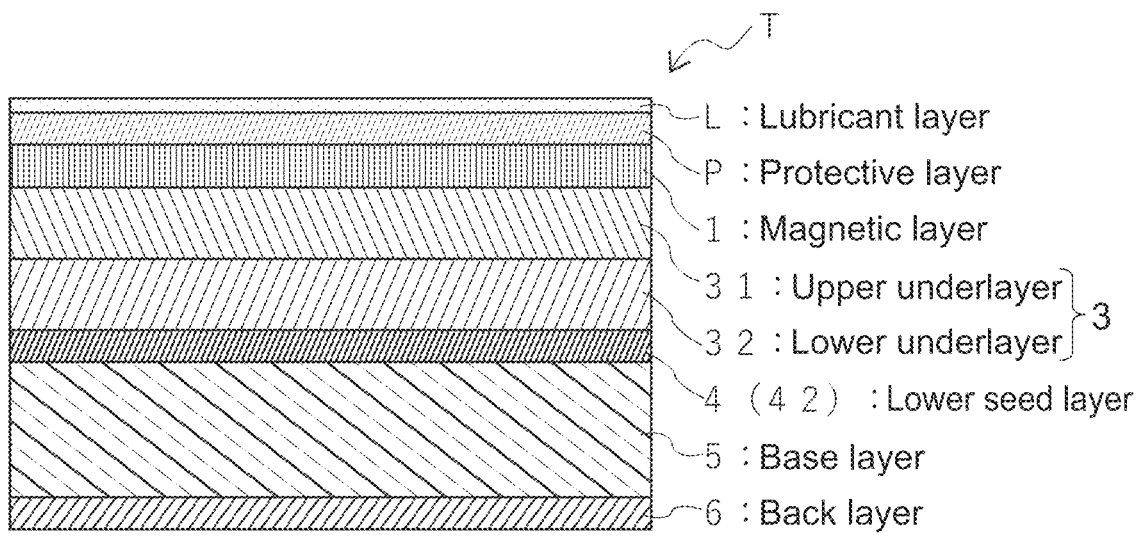
FIG. 2 is a diagram showing a basic layer structure of a second embodiment example.

FIG. 2 is a cross-sectional view showing a layer structure of the magnetic recording tape T according to a second embodiment example of the present technology. This magnetic recording tape T has a layer structure in which the intermediate layer 2 is absent between the magnetic layer 1 and the underlayer 3. More specifically, the magnetic recording tape T includes the magnetic layer 1, the two-layered underlayer 3 (31, 32), the seed layer 4, the base layer 5, and the back layer 6, and further includes the protective layer P immediately on the magnetic layer 1 and the lubricant layer L immediately on the protective layer P.

In this second embodiment example, the magnetic recording tape T in which the intermediate layer 2 (see FIG. 1) containing ruthenium that is a rare metal is absent is realized. Meanwhile, the underlayer 3 has a crystal structure having a hexagonal close-packed structure as in the magnetic layer 1, and thus, the deterioration of the orientation characteristics of the magnetic layer 1 due to the absence of the intermediate layer 2 is suppressed. Note that this second embodiment example has a layer configuration corresponding to that in Example 15 described below.

(1-3) Third Embodiment Example

Figure 3:
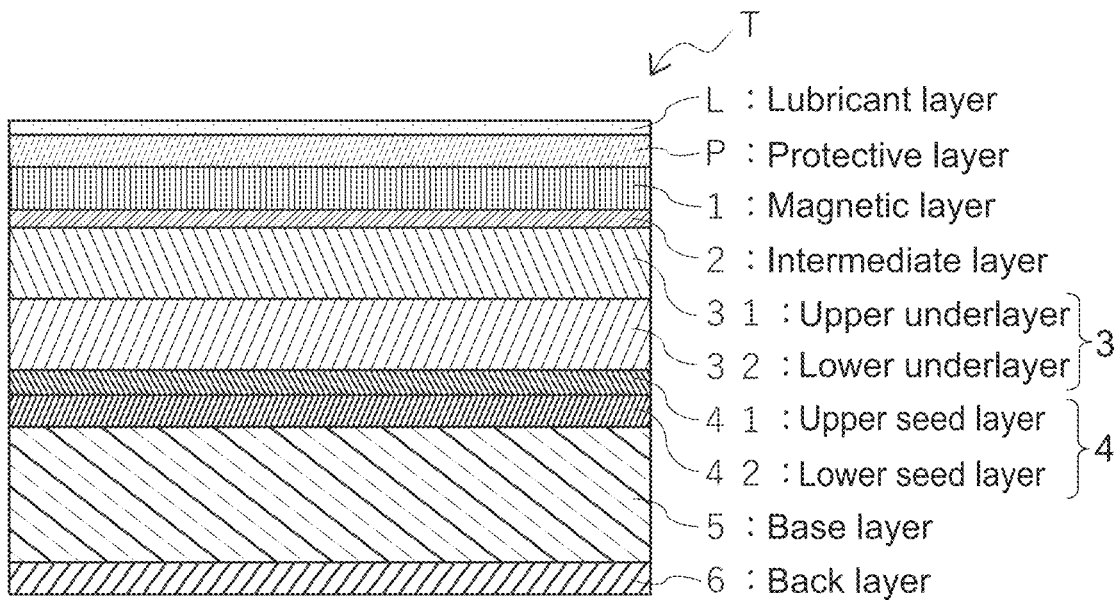
FIG. 3 is a diagram showing a basic layer structure of a third embodiment example.

The magnetic recording tape T shown in FIG. 3 includes the intermediate layer 2 as a lower layer of the magnetic layer 1, and has a two-layer structure of the underlayer 3 (the upper underlayer 31 and the lower underlayer 32) and a two-layer structure of the seed layer 4 including an upper seed layer 41 and a lower seed layer 41. The lubricant layer L, the protective layer P, the magnetic layer 1, the base layer 5, and the back layer 6 have the same layer structure as that in the first embodiment example.

In the layer configuration in this third embodiment example, for example, the upper seed layer 41 may be formed of nickel tungsten ($Ni_{96}W_6$), and the lower seed layer 42 contains at least Ti, Cr, and O, and may have a composition having the average atomic number ratio represented by the above-mentioned formula (3). Note that this third embodiment example has a layer configuration corresponding to that in Examples 16 and 17 described below.

The thickness of the upper seed 41 is favorably within the range of 5 nm or more and 30 nm or less, and the thickness of the lower underlayer 42 is favorably 2 nm or more and 30 nm.

(1-4) Fourth Embodiment Example

Figure 4:
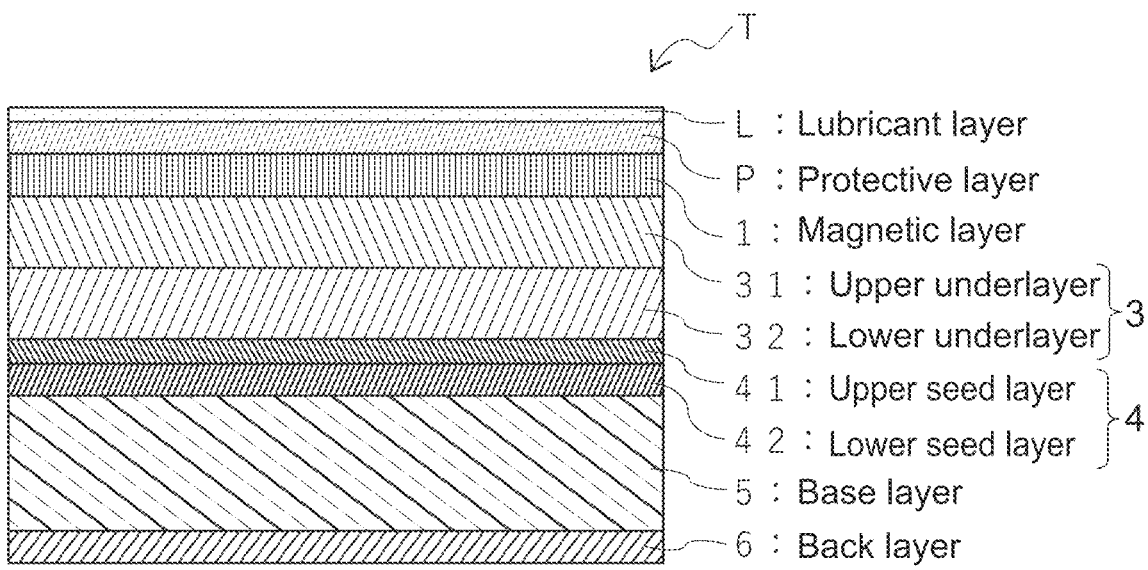
FIG. 4 is a diagram showing a basic layer structure of a fourth embodiment example.

The magnetic recording tape T shown in FIG. 4 has a layer structure similar to that in the above-mentioned third embodiment example except that the intermediate layer 2 is omitted. Also in this fourth embodiment example, the same material and composition as those in the above-mentioned third embodiment example can be adopted for the seed layer 41, 42. The lubricant layer L, the protective layer P, the magnetic layer 1, the base layer 5, and the back layer 6 have a layer structure similar to that in the first embodiment example. Note that this fourth embodiment example has a layer configuration corresponding to Example 18 described below.

(1-5) Fifth Embodiment Example

Figure 5:
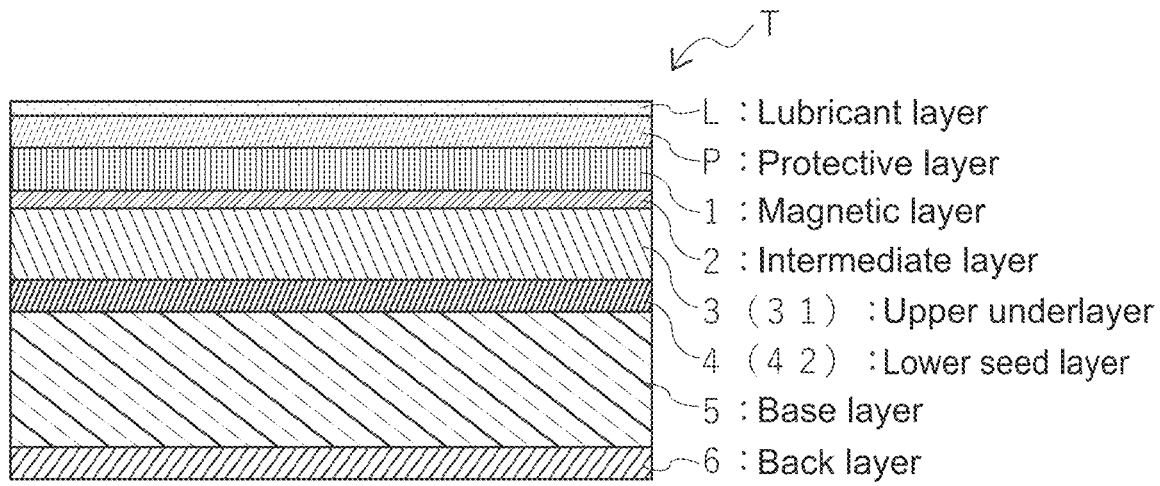
FIG. 5 is a diagram showing a basic layer structure of a fifth embodiment example.

The magnetic recording tape T shown in FIG. 5 includes the intermediate layer 2, and the underlayer 3 located immediately below the intermediate layer 2 includes only the upper underlayer 31. The seed layer 4 located immediately below the underlayer 3 (upper underlayer 31) includes only the lower seed layer 42. The lubricant layer L, the protective layer P, the magnetic layer 1, the base layer 5, and the back layer 6 are similar to those in the first embodiment example. Note that this fifth embodiment example has a layer configuration corresponding to that in Example 19 described below.

(1-6) Sixth Embodiment Example

The magnetic recording tape T shown in FIG. 6 includes the intermediate layer 2, and the underlayer 3 located immediately below the intermediate layer 2 has a two-layer structure including the upper underlayer 31 and the lower underlayer 32. The seed layer 4 located below the underlayer 3 (31, 32) includes only the lower seed layer 42. Then, the magnetic recording tape T has a layer structure in which a soft magnetic underlayer (abbreviated as SUL) 7 of a single layer is provided between the lower seed layer 42 and the base layer 5. The lubricant layer L, the protective layer P, the magnetic layer 1, the base layer 5, and the back layer 6 are similar to those in the first embodiment example. Note that this sixth embodiment example has a layer configuration corresponding to that in Example 20 described below.

<SUL (Soft Magnetic Underlayer)>

Figure 6:
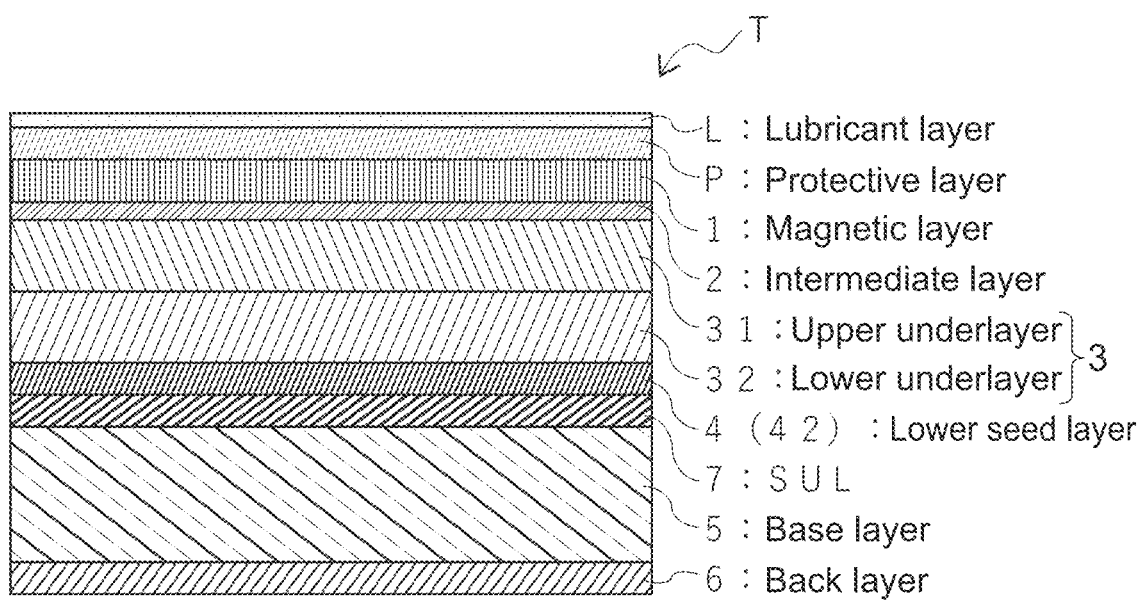
FIG. 6 is a diagram showing a basic layer structure of a sixth embodiment example.

SUL indicated by the reference symbol 7 in FIG. 6 is a layer provided in order to efficiently draw the leakage magnetic flux generated from the perpendicular magnetic head into the magnetic layer 1 when magnetic recording is performed on the magnetic layer 1. That is, by providing the SUL 7, it is possible to increase the magnetic field strength from the magnetic head and achieve the magnetic recording tape T that is more suitable for high density recording. Note that the magnetic recording tape T including the SUL 7 can be referred to as "double-layer perpendicular magnetic recording tape".

The SUL 7 contains an amorphous soft magnetic material. For example, the SUL 7 can be formed of a CoZrNb alloy that is a Co material. In addition, CoZrTa, CoZrTaNb, and the like can be adopted. Further, FeCoB, FeCoZr, FeCoTa, and the like that are Fe materials may be adopted. Note that the SUL 7 may include an antiparallel coupled SUL (APC-SUL) having a structure in which two soft magnetic layers are formed with a thin intervening layer sandwiched therebetween and the magnetization is positively made antiparallel by using exchange coupling through the intervening layer.

Figure 7:
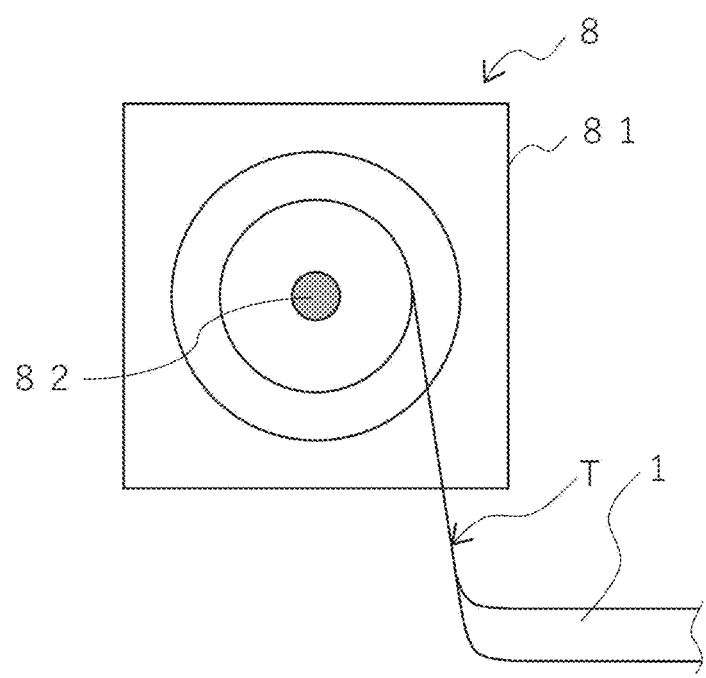
FIG. 7 is a diagram showing an embodiment example of a magnetic recording tape cartridge according to the present technology.

•Embodiment Example of Magnetic Recording Tape Cartridge According to Present Technology FIG. 7 schematically shows an example of a cartridge product housing the magnetic recording tape according to the present technology. The magnetic recording tape T cut into a predetermined width is cut into a predetermined length according to the product type to achieve a form of a cartridge magnetic recording tape 8 as shown in FIG. 7. Specifically, the magnetic recording tape having a predetermined length is wound on a reel 82 provided in a cartridge case 81 and housed therein.

•Example of Method of Producing Magnetic Recording Tape According to Present Technology The magnetic recording tape T according to the present technology can be produced, for example, as follows. First, the seed layer 4, the underlayer 3, the intermediate layer 2, and the magnetic layer 1 are deposited in the stated order on one main surface of the base layer 5 by sputtering. The atmosphere in the deposition chamber during sputtering is set to, for example, approximately $1\times10^{-5}$ Pa to $5\times10^{-5}$ Pa. The film thickness and characteristics (e.g., magnetic properties) of the seed layer 4, the underlayer 3, the intermediate layer 2, and the magnetic layer 1 can be controlled by adjusting the tape line speed for winding the film constituting the base layer 5, the pressure (sputtering gas pressure) of Ar (argon) gas introduced at the time of sputtering, the input power, and the like.

Note that in the embodiment examples (see FIG. 2 and FIG. 4) in which the intermediate layer 2 is not provided, deposition of the intermediate layer 2 is not performed and the magnetic layer 1 is deposited immediately on the underlayer 3. In the case where the seed layer 4 has a two-layer structure including the lower seed layer 41 and the upper seed layer 42, these layers are deposited in the stated order. In the case where the underlayer 3 includes the lower underlayer 31 and the upper underlayer 32, these layers are deposited in the stated order.

Next, the protective layer P is deposited on the oriented magnetic layer 1. As the method of depositing the protective layer P, for example, a chemical vapor deposition (abbreviated as CVD) method or a Physical Vapor Deposition (abbreviated as PVD) method can be used.

Next, a binder, inorganic particles, a lubricant, and the like are kneaded and dispersed in a solvent to prepare a coating material for the back layer 6. The prepared coating material is applied onto the other main surface of the base layer 6 and dried to form the back layer 6.

Next, a lubricant is applied onto the deposited protective layer P to form the lubricant layer L. As the method of applying the lubricant, for example, various coating methods such as gravure coating and dip coating can be adopted, and the present technology is not particularly limited thereto.

As a subsequent step, in order to adjust the warp of the magnetic tape in the tape width direction, hot roll treatment in which a raw roll is brought into contact with a metal roll heated to the surface temperature of approximately 150 to 230° C. and caused to travel may be performed.

The wide magnetic recording tape T obtained as described above is cut into the magnetic recording tape width that conforms to the standard of the type of the magnetic recording tape (cutting step). For example, the wide magnetic recording tape T is cut into a ½ inch (12.65 mm) width, and wound on a predetermined roll. As a result, it is possible to obtain a long magnetic recording tape having a target magnetic recording tape width. In this cutting step, necessary inspection may be performed.

Next, the magnetic recording tape cut into the predetermined width is cut into a predetermined length according to the product type to achieve a form of the cartridge magnetic recording tape 8 as shown in FIG. 7. Specifically, the magnetic recording tape T having a predetermined length is wound on the reel 82 provided in the cartridge case 81 and housed therein.

After the final product inspection step, the product is packed and shipped. In the inspection step, for example, pre-shipment inspection of the electromagnetic conversion characteristics, travelling durability, and the like are performed to check the final quality of the magnetic recording tape.

It should be noted that the present technology may take the following configurations.

(1) A magnetic recording tape, including at least:

a base layer that includes a long film having flexibility; and a magnetic layer formed on a side of one main surface of the base layer, in which an under layer and a seed layer are provided in the stated order from a side of the magnetic layer toward a side of the base layer between the magnetic layer and the base layer, the underlayer contains at least Co and Cr, and has an average atomic number ratio represented by the following formula (1), and the seed layer formed on the base layer has a film thickness of 5 nm or more and 30 nm or less, and contains Ti and O and has an average atomic number ratio represented by the following formula (2) or contains Ti—Cr—O and has an average composition represented by the following formula (3).

$$Co_{(100-y)}Cr_y \qquad (1)$$

(where y is within a range of 37≤y≤45.)

$$Ti_{(100-x)}O_x \qquad (2)$$

(where x≤10.)

$$(TiCr)_{(100-x)}O_x \qquad (3)$$

(where x≤10.)

(2) The magnetic recording tape according to (1), in which
the underlayer has a two-layer structure.

(3) The magnetic recording tape according to (1) or (2), in which
the underlayer further contains a metal oxide.

(4) The magnetic recording tape according to (3), in which
the metal oxide is $SiO_2$ or $TiO_2$.

(5) The magnetic recording tape according to any one of (1) to (4), in which
an intermediate layer containing ruthenium is provided between the underlayer and the magnetic layer, and
the intermediate layer has a thickness of 0.5 to 6.0 nm.

(6) The magnetic recording tape according to any one of (1) to (5), in which
a squareness ratio of the magnetic recording tape is 90% or more.

(7) The magnetic recording tape according to any one of (1) to (6), in which
a coercive force of the magnetic recording tape is 2,100 Oe or more.

(8) The magnetic recording tape according to any one of (1) to (7), in which
the magnetic layer is a perpendicularly oriented magnetic layer.

(9) The magnetic recording tape according to any one of (1) to (8), in which
the magnetic layer has a granular structure in which particles containing Co, Pt, and Cr are separated from each other with an oxide.

(10) A magnetic recording tape cartridge having a configuration in which the magnetic recording tape according to any one of (1) to (9) is housed in a case while being wound on a reel.

EXAMPLE

Hereinafter, the present technology will be described more specifically with reference to Examples, but the present technology is not limited to only these Examples.

In these Examples, the thicknesses of a seed layer, an underlayer, an intermediate layer, a recording layer, and a protective layer were obtained as follows. First, the magnetic tape was thinly processed in the film cross-sectional direction to prepare a sample piece. The sample piece was observed with a transmission electron microscope (hereinafter, referred to as "TEM".) to measure the thicknesses of the respective layers from the TEM image.

Further, in these Examples, the average atomic number ratios of the seed layer and the like were obtained as follows. First, ion milling was performed on the magnetic tape to perform depth direction analysis (depth profile measurement) of the seed layer by AES. Next, the average atomic number ratio (average composition) in the film thickness direction was obtained from the obtained depth profile.

Example 1

(Step of Depositing Seed Layer)
First, under the following deposition conditions, a seed layer formed of $Ti_{(100-x)}O_x$ (where x=2.) was deposited by sputtering on the surface of a long polymer film forming a non-magnetic base layer so as to have a film thickness of 10 nm.
Deposition method: DC magnetron sputtering method
Target: Ti target
Gas type: Ar
Gas pressure: 0.25 Pa
Input power: 0.1 W/mm$^2$
(Step of Depositing Lower Underlayer)
Next, under the following deposition conditions, a lower underlayer formed of $Co_{(100-y)}Cr_y$ (where y=40.) was deposited by sputtering on the above-mentioned seed layer so as to have a film thickness of 30 nm.
Deposition method: DC magnetron sputtering method
Target: CoCr target
Gas type: Ar
Gas pressure: 0.2 Pa Input power: 0.13 W/mm$^2$
Mask: None
(Step of Depositing Upper Underlayer)
Next, under the following deposition conditions, an upper underlayer formed of $[Co_{(100-y)}Cr_y]_{(100-z)}(SiO_2)_z$ (where y=40, z=0.) was deposited by sputtering on the above-mentioned lower underlayer so as to have a film thickness of 30 nm.
Target: CoCrSiO$_2$ target
Gas type: Ar
Gas pressure: 6 Pa
Input power: 0.13 W/mm$^2$
Mask: None
(Step of Depositing Intermediate Layer)
Next, under the following deposition conditions, an intermediate layer formed of Ru was deposited by sputtering on the underlayer so as to have a film thickness of 2 nm.
Deposition method: DC magnetron sputtering method
Target: Ru target
Gas type: Ar
Gas pressure: 0.5 Pa
(Step of Depositing Magnetic Layer)
Next, under the following deposition conditions, a magnetic layer formed of (CoCrPt)—(SiO$_2$) was deposited on the above-mentioned intermediate layer so as to have a film thickness of 14 nm.
Deposition method: DC magnetron sputtering method
Target: (CoCrPt)—(SiO$_2$) target
Gas type: Ar
Gas pressure: 1.5 Pa
(Step of Depositing Protective Layer)
Next, under the following deposition conditions, a protective layer formed of carbon was deposited on the recording layer so as to have a film thickness of 5 nm.
Deposition method: DC magnetron sputtering method
Target: carbon target
Gas type: Ar
Gas pressure: 1.0 Pa
(Step of Depositing Lubricant Layer)
Next, the prepared lubricant coating material was applied onto the protective layer to deposit a lubricant layer. Note that the lubricant coating material was prepared by mixing 0.11 mass % of carboxylic acid perfluoroalkyl ester and 0.06 mass % of fluoroalkyldicarboxylic acid derivative in a general-purpose solvent.
(Step of Depositing Back Layer)
Next, a coating material for forming a back layer was applied to the other main surface of the polymer film forming a base layer and dried to form a back layer. More specifically, a back layer formed of a non-magnetic powder containing carbon and calcium carbonate, and a polyurethane binder was formed to have a thickness of 0.3 μm. In this way, a target magnetic recording tape was obtained (see FIG. 1 again for the entire layer configuration).

Example 2

A magnetic recording tape was obtained in a way similar to that in the above-mentioned Example 1 except that the film thickness of the lower seed layer was changed to 5 nm.

Example 3

A magnetic recording tape was obtained in a way similar to that in the above-mentioned Example 1 except that the film thickness of the lower seed layer was changed to 30 nm.

Example 4

A magnetic recording tape was obtained in a way similar to that in the above-mentioned Example 1 except that the lower seed layer was formed of $Ti_{(100-x)}O_x$ (where x=9.).

Example 5

A magnetic recording tape was obtained in a way similar to that in the above-mentioned Example 1 except that the lower seed layer was formed of $Ti_{(100-x)}O_x$ (where x=5.).

Example 6

A magnetic recording tape was obtained in a way similar to that in the above-mentioned Example 1 except that the lower underlayer was formed of $Co_{(100-y)}Cr_y$ (where y=37.) and the upper underlayer was formed of $[Co_{(100-y)}Cr_y]_{(100-y)}(SiO_2)_z$ (where y=37 and z=0.).

Example 7

A magnetic recording tape was obtained in a way similar to that in the above-mentioned Example 1 except that the lower underlayer was formed of $Co_{(100-y)}Cr_y$ (where y=45.) and the upper underlayer was formed of $[Co_{(100-y)}Cr_y]_{(100-z)}(SiO_2)_z$ (where y=45 and z=0.).

Example 8

A magnetic recording tape was obtained in a way similar to that in the above-mentioned Example 1 except that the film thickness of the intermediate layer formed of Ru was changed to 6 nm.

Example 9

A magnetic recording tape was obtained in a way similar to that in the above-mentioned Example 1 except that the film thickness of the intermediate layer formed of Ru was changed to 5 nm.

Example 10

A magnetic recording tape was obtained in a way similar to that in the above-mentioned Example 1 except that the film thickness of the intermediate layer formed of Ru was changed to 0.5 nm.

Example 11

A magnetic recording tape was obtained in a way similar to that in the above-mentioned Example 1 except that the upper underlayer was formed of $[Co_{(100-y)}Cr_y]_{(100-z)}(SiO_2)_z$ (where y=40 and z=10.). That is, the upper underlayer in this Example 11 contains $SiO_2$.

Example 12

A magnetic recording tape was obtained in a way similar to that in the above-mentioned Example 1 except that the upper underlayer was formed of $[Co_{(100-y)}Cr_y]_{(100-z)}(SiO_2)_z$ (where y=40 and z=7.). That is, the upper underlayer in this Example 12 contains $SiO_2$.

Example 13

A magnetic recording tape was obtained in a way similar to that in the above-mentioned Example 1 except that the upper underlayer was formed of $[Co_{(100-y)}Cr_y]_{(100-z)}(SiO_2)_z$ (where y=40 and z=4.). That is, the upper underlayer in this Example 13 contains $SiO_2$.

Example 14

A magnetic recording tape was obtained in a way similar to that in the above-mentioned Example 1 except that the upper underlayer was formed of $[Co_{(100-y)}Cr_y]_{(100-z)}(TiO_2)_z$ (where y=40 and z=4.). That is, the upper underlayer in this Example contains $TiO_2$.

Example 15

A magnetic recording tape was obtained in a way similar to that in the above-mentioned Example 1 except that a magnetic layer formed of (CoCrPt)—($TiO_2$) was formed on the intermediate layer. That is, $TiO_2$ is used for the non-magnetic grain boundaries in the magnetic layer in this Example 15. Note that the basic layer configuration corresponding to the above-mentioned Examples 1 to 15 corresponds to FIG. 1 (see again).

Example 16

A magnetic recording tape was obtained in a way similar to that in the above-mentioned Example 1 except that the intermediate layer formed of Ru was omitted. The basic layer configuration in this Example 16 corresponds to FIG. 2 (see again).

Example 17

A magnetic recording tape was obtained in a way similar to that in the above-mentioned Example 1 except that the lower seed layer was formed of $(TiCr)_{(100-x)}O_x$ (x=2.) and an upper seed layer formed of $Ni_{96}W_6$ was provided on this lower seed layer so as to have a film thickness of 5 nm. In this Example 17, the seed layer has a two-layer structure. Note that the sputtering deposition conditions of this upper seed layer are as follows.

Deposition method: DC magnetron sputtering method
Target: NiW target
Gas type: Ar
Gas pressure: 0.25 Pa
Input power: 0.03 W/mm$^2$

Example 18

A magnetic recording tape was obtained in a way similar to that in the above-mentioned Example 1 except that the upper underlayer was formed of $[Co_{(100-y)}Cr_y]_{(100-z)}(SiO_2)_z$ (where y=40 and z=4.), the lower seed layer was formed of $(TiCr)_{(100-x)}O_x$ (x=2.), and the upper seed layer formed of $Ni_{96}W_6$ was provided on this lower seed layer so as to have a film thickness of 5 nm. That is, in this Example 18, the seed layer has a two-layer structure, the lower seed layer contains Cr, and the upper underlayer contains $SiO_2$. Note that the basic layer configuration in Examples 17 and 18 corresponds to FIG. 3 (see again).

Example 19

A magnetic recording tape was obtained in a way similar to that in the above-mentioned Example 1 except that the intermediate layer formed of Ru was omitted, the lower seed layer was formed of $(TiCr)_{(100-x)}O_x$ (x=2.), and an upper seed layer formed of $Ni_{96}W_6$ was provided on this lower seed layer so as to have a film thickness of 5 nm. Note that the basic layer configuration of the magnetic recording tape according to this Example 19 corresponds to FIG. 4 (see again).

Example 20

A magnetic recording tape was obtained in a way similar to that in the above-mentioned Example 1 except that the underlayer included only the upper underlayer. Note that the basic layer configuration of the magnetic recording tape according to this Example 20 corresponds to FIG. 5 (see again).

Example 21

A magnetic recording tape was obtained in a way similar to that in the above-mentioned Example 1 except that a soft magnetic underlayer formed of a CoZrNb alloy was formed between the seed layer and the base layer so as to have a film thickness of 10 nm. Note that the basic layer configuration of the magnetic recording tape according to this Example 21 corresponds to FIG. 6 (see again). The sputtering deposition conditions of this soft magnetic underlayer are as follows.
Deposition method: DC magnetron sputtering method
Target: CoZrNb target
Gas type: Ar
Gas pressure: 0.1 Pa Comparative Example 1

A magnetic recording tape was obtained in a way similar to that in the above-mentioned Example 1 except that the film thickness of the lower seed layer was reduced from 10 nm to 2 nm.

Comparative Example 2

A magnetic recording tape was obtained in a way similar to that in the above-mentioned Example 1 except that the film thickness of the lower seed layer was reduced from 10 nm to 4 nm.

Comparative Example 3

A magnetic recording tape was obtained in a way similar to that in the above-mentioned Example 1 except that the lower seed layer was formed of $Ti_{(100-x)}O_x$ (where x=11.).

Comparative Example 4

A magnetic recording tape was obtained in a way similar to that in the above-mentioned Example 1 except that the lower seed layer was formed of $Ti_{(100-x)}O_x$ (where x=13.).

Comparative Example 5

A magnetic recording tape was obtained in a way similar to that in the above-mentioned Example 1 except that the upper underlayer was formed of $[Co_{(100-y)}Cr_y]_{(100-z)}(SiO_2)_z$ (where y=36 and z=0.).

Comparative Example 6

A magnetic recording tape was obtained in a way similar to that in the above-mentioned Example 1 except that the upper underlayer was formed of $[Co_{(100-y)}Cr_y]_{(100-z)}(SiO_2)_z$ (where y=46 and z=0.).

Comparative Example 7

A magnetic recording tape was obtained in a way similar to that in the above-mentioned Example 1 except that the upper underlayer was formed of $[Co_{(100-y)}Cr_y]_{(100-z)}(SiO_2)_z$ (where y=30 and z=0.).

Comparative Example 8

A magnetic recording tape was obtained in a way similar to that in the above-mentioned Example 1 except that the upper underlayer was formed of $[Co_{(100-y)}Cr_y]_{(100-z)}(SiO_2)_z$ (where y=50 and z=0.).

Comparative Example 9

A magnetic recording tape was obtained in a way similar to that in the above-mentioned Example 1 except that the upper underlayer was formed of $[Co_{(100-y)}Cr_y]_{(100-z)}(SiO_2)_z$ (where y=40 and z=11.).

Comparative Example 10

A magnetic recording tape was obtained in a way similar to that in the above-mentioned Example 1 except that the upper underlayer was formed of $[Co_{(100-y)}Cr_y]_{(100-z)}(SiO_2)_z$ (where y=40 and z=12.).

The layer configurations in Examples 1 to 21 and Comparative Examples 1 to 10 described above were summarized in the following "Table 1".

TABLE 1

| | Magnetic layer | | Intermediate layer | | Underlayer Upper underlayer | | | |
|---|---|---|---|---|---|---|---|---|
| | Magnetic material | Thickness (nm) | Material | Thickness (nm) | Material | Y(mol. %) | Z(mol. %) | Film thickness |
| Example 1 | CoPtCr—SiO$_2$ | 14 | Ru | 2 | $[Co_{(100-Y)}Cr_Y]_{(100-Z)}(SiO_2)_Z$ | 40 | 0 | 30 |
| Example 2 | CoPtCr—SiO$_2$ | 14 | Ru | 2 | $[Co_{(100-Y)}Cr_Y]_{(100-Z)}(SiO_2)_Z$ | 40 | 0 | 30 |
| Example 3 | CoPtCr—SiO$_2$ | 14 | Ru | 2 | $[Co_{(100-Y)}Cr_Y]_{(100-Z)}(SiO_2)_Z$ | 40 | 0 | 30 |
| Example 4 | CoPtCr—SiO$_2$ | 14 | Ru | 2 | $[Co_{(100-Y)}Cr_Y]_{(100-Z)}(SiO_2)_Z$ | 40 | 0 | 30 |
| Example 5 | CoPtCr—SiO$_2$ | 14 | Ru | 2 | $[Co_{(100-Y)}Cr_Y]_{(100-Z)}(SiO_2)_Z$ | 40 | 0 | 30 |
| Example 6 | CoPtCr—SiO$_2$ | 14 | Ru | 2 | $[Co_{(100-Y)}Cr_Y]_{(100-Z)}(SiO_2)_Z$ | 37 | 0 | 30 |
| Example 7 | CoPtCr—SiO$_2$ | 14 | Ru | 2 | $[Co_{(100-Y)}Cr_Y]_{(100-Z)}(SiO_2)_Z$ | 45 | 0 | 30 |
| Example 8 | CoPtCr—SiO$_2$ | 14 | Ru | 6 | $[Co_{(100-Y)}Cr_Y]_{(100-Z)}(SiO_2)_Z$ | 40 | 0 | 30 |
| Example 9 | CoPtCr—SiO$_2$ | 14 | Ru | 5 | $[Co_{(100-Y)}Cr_Y]_{(100-Z)}(SiO_2)_Z$ | 40 | 0 | 30 |
| Example 10 | CoPtCr—SiO$_2$ | 15 | Ru | 0.5 | $[Co_{(100-Y)}Cr_Y]_{(100-Z)}(SiO_2)_Z$ | 40 | 0 | 30 |
| Example 11 | CoPtCr—SiO$_2$ | 14 | Ru | 2 | $[Co_{(100-Y)}Cr_Y]_{(100-Z)}(SiO_2)_Z$ | 40 | 10 | 30 |
| Example 12 | CoPtCr—SiO$_2$ | 14 | Ru | 2 | $[Co_{(100-Y)}Cr_Y]_{(100-Z)}(SiO_2)_Z$ | 40 | 7 | 30 |

TABLE 1-continued

| | | | | | | | | |
|---|---|---|---|---|---|---|---|---|
| Example 13 | CoPtCr—SiO$_2$ | 14 | Ru | 2 | [Co$_{(100-Y)}$Cr$_Y$]$_{(100-Z)}$(SiO$_2$)$_Z$ | 40 | 4 | 30 |
| Example 14 | CoPtCr—SiO$_2$ | 14 | Ru | 2 | [Co$_{(100-Y)}$Cr$_Y$]$_{(100-Z)}$(SiO$_2$)$_Z$ | 40 | 4 | 30 |
| Example 15 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Example 16 | CoPtCr—SiO$_2$ | 14 | Ru | 0 | [Co$_{(100-Y)}$Cr$_Y$]$_{(100-Z)}$(SiO$_2$)$_Z$ | 40 | 0 | 30 |
| Example 17 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Example 18 | CoPtCr—SiO$_2$ | 14 | Ru | 2 | [Co$_{(100-Y)}$Cr$_Y$]$_{(100-Z)}$(SiO$_2$)$_Z$ | 40 | 4 | 30 |
| Example 19 | CoPtCr—SiO$_2$ | 14 | Ru | 0 | [Co$_{(100-Y)}$Cr$_Y$]$_{(100-Z)}$(SiO$_2$)$_Z$ | 40 | 0 | 30 |
| Example 20 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Example 21 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Comparative Example 1 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Comparative Example 2 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Comparative Example 3 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Comparative Example 4 | CoPtCr—SiO$_2$ | 14 | Ru | 2 | [Co$_{(100-Y)}$Cr$_Y$]$_{(100-Z)}$(SiO$_2$)$_Z$ | 40 | 0 | 30 |
| Comparative Example 5 | CoPtCr—SiO$_2$ | 14 | Ru | 2 | [Co$_{(100-Y)}$Cr$_Y$]$_{(100-Z)}$(SiO$_2$)$_Z$ | 36 | 0 | 30 |
| Comparative Example 6 | CoPtCr—SiO$_2$ | 14 | Ru | 2 | [Co$_{(100-Y)}$Cr$_Y$]$_{(100-Z)}$(SiO$_2$)$_Z$ | 46 | 0 | 30 |
| Comparative Example 7 | CoPtCr—SiO$_2$ | 14 | Ru | 2 | [Co$_{(100-Y)}$Cr$_Y$]$_{(100-Z)}$(SiO$_2$)$_Z$ | 30 | 0 | 30 |
| Comparative Example 8 | CoPtCr—SiO$_2$ | 14 | Ru | 2 | [Co$_{(100-Y)}$Cr$_Y$]$_{(100-Z)}$(SiO$_2$)$_Z$ | 50 | 0 | 30 |
| Comparative Example 9 | CoPtCr—SiO$_2$ | 14 | Ru | 2 | [Co$_{(100-Y)}$Cr$_Y$]$_{(100-Z)}$(SiO$_2$)$_Z$ | 40 | 11 | 30 |
| Comparative Example 10 | CoPtCr—SiO$_2$ | 14 | Ru | 2 | [Co$_{(100-Y)}$Cr$_Y$]$_{(100-Z)}$(SiO$_2$)$_Z$ | 40 | 12 | 30 |

| | Underlayer | | | Seed layer | | | | Soft magnetic under layer (SUL) |
|---|---|---|---|---|---|---|---|---|
| | Lower underlayer | | | Upper seed layer | | Lower seed layer | | CoZrNb |
| | Material | Y(mol. %) | Film thickness | Material | Film thickness | Material | X(mol. %) | Film thickness (nm) | Film thickness |
| Example 1 | Co$_{(100-Y)}$Cr$_Y$ | 40 | 30 | — | — | Ti$_{(100-x)}$O$_x$ | 2 | 10 | — |
| Example 2 | Co$_{(100-Y)}$Cr$_Y$ | 40 | 30 | — | — | Ti$_{(100-x)}$O$_x$ | 2 | 5 | — |
| Example 3 | Co$_{(100-Y)}$Cr$_Y$ | 40 | 30 | — | — | Ti$_{(100-x)}$O$_x$ | 2 | 30 | — |
| Example 4 | Co$_{(100-Y)}$Cr$_Y$ | 40 | 30 | — | — | Ti$_{(100-x)}$O$_x$ | 9 | 10 | — |
| Example 5 | Co$_{(100-Y)}$Cr$_Y$ | 40 | 30 | — | — | Ti$_{(100-x)}$O$_x$ | 5 | 10 | — |
| Example 6 | Co$_{(100-Y)}$Cr$_Y$ | 37 | 30 | — | — | Ti$_{(100-x)}$O$_x$ | 2 | 10 | — |
| Example 7 | Co$_{(100-Y)}$Cr$_Y$ | 45 | 30 | — | — | Ti$_{(100-x)}$O$_x$ | 2 | 10 | — |
| Example 8 | Co$_{(100-Y)}$Cr$_Y$ | 40 | 30 | — | — | Ti$_{(100-x)}$O$_x$ | 2 | 10 | — |
| Example 9 | Co$_{(100-Y)}$Cr$_Y$ | 40 | 30 | — | — | Ti$_{(100-x)}$O$_x$ | 2 | 10 | — |
| Example 10 | Co$_{(100-Y)}$Cr$_Y$ | 40 | 30 | — | — | Ti$_{(100-x)}$O$_x$ | 2 | 10 | — |
| Example 11 | Co$_{(100-Y)}$Cr$_Y$ | 40 | 30 | — | — | Ti$_{(100-x)}$O$_x$ | 2 | 10 | — |
| Example 12 | Co$_{(100-Y)}$Cr$_Y$ | 40 | 30 | — | — | Ti$_{(100-x)}$O$_x$ | 2 | 10 | — |
| Example 13 | Co$_{(100-Y)}$Cr$_Y$ | 40 | 30 | — | — | Ti$_{(100-x)}$O$_x$ | 2 | 10 | — |
| Example 14 | Co$_{(100-Y)}$Cr$_Y$ | 40 | 30 | — | — | Ti$_{(100-x)}$O$_x$ | 2 | 10 | — |
| Example 15 | Co$_{(100-Y)}$Cr$_Y$ | 40 | 30 | — | — | Ti$_{(100-x)}$O$_x$ | 2 | 10 | — |
| Example 16 | Co$_{(100-Y)}$Cr$_Y$ | 40 | 30 | — | — | Ti$_{(100-x)}$O$_x$ | 2 | 10 | — |
| Example 17 | Co$_{(100-Y)}$Cr$_Y$ | 40 | 30 | Ni$_{96}$W$_6$ | 5 | (TiCr)$_{(100-x)}$O$_x$ | 2 | 10 | — |
| Example 18 | Co$_{(100-Y)}$Cr$_Y$ | 40 | 30 | Ni$_{96}$W$_6$ | 5 | (TiCr)$_{(100-x)}$O$_x$ | 2 | 10 | — |
| Example 19 | Co$_{(100-Y)}$Cr$_Y$ | 40 | 30 | Ni$_{96}$W$_6$ | 5 | (TiCr)$_{(100-x)}$O$_x$ | 2 | 10 | — |
| Example 20 | — | — | — | — | — | Ti$_{(100-x)}$O$_x$ | 2 | 10 | — |
| Example 21 | Co$_{(100-Y)}$Cr$_Y$ | 40 | 30 | — | — | Ti$_{(100-x)}$O$_x$ | 2 | 10 | 10 |
| Comparative Example 1 | Co$_{(100-Y)}$Cr$_Y$ | 40 | 30 | — | — | Ti$_{(100-x)}$O$_x$ | 2 | 2 | — |
| Comparative Example 2 | Co$_{(100-Y)}$Cr$_Y$ | 40 | 30 | — | — | Ti$_{(100-x)}$O$_x$ | 2 | 4 | — |
| Comparative Example 3 | Co$_{(100-Y)}$Cr$_Y$ | 40 | 30 | — | — | Ti$_{(100-x)}$O$_x$ | 11 | 10 | — |
| Comparative Example 4 | Co$_{(100-Y)}$Cr$_Y$ | 40 | 30 | — | — | Ti$_{(100-x)}$O$_x$ | 13 | 10 | — |
| Comparative Example 5 | Co$_{(100-Y)}$Cr$_Y$ | 40 | 30 | — | — | Ti$_{(100-x)}$O$_x$ | 2 | 10 | — |
| Comparative Example 6 | Co$_{(100-Y)}$Cr$_Y$ | 40 | 30 | — | — | Ti$_{(100-x)}$O$_x$ | 2 | 10 | — |
| Comparative Example 7 | Co$_{(100-Y)}$Cr$_Y$ | 40 | 30 | — | — | Ti$_{(100-x)}$O$_x$ | 2 | 10 | — |
| Comparative Example 8 | Co$_{(100-Y)}$Cr$_Y$ | 40 | 30 | — | — | Ti$_{(100-x)}$O$_x$ | 2 | 10 | — |

TABLE 1-continued

| | | | | | | | | | |
|---|---|---|---|---|---|---|---|---|---|
| Comparative Example 9 | $Co_{(100-Y)}Cr_Y$ | 40 | 30 | — | — | $Ti_{(100-x)}O_x$ | 2 | 10 | — |
| Comparative Example 10 | $Co_{(100-Y)}Cr_Y$ | 40 | 30 | — | — | $Ti_{(100-x)}O_x$ | 2 | 10 | — |

The characteristics evaluation of a total of five items including the following (1) to (5) were performed on the magnetic recording tapes having the above-mentioned layer configurations according to Examples 1 to 21 and Comparative Examples 1 to 10. The method of measuring the five items are as follows.

(1) Saturation Magnetization Amount Ms

The magnetization amount in the case where an external magnetic field of 15,000 Oe was applied was obtained using a vibrating sample magnetometer (VSM), and a value obtained by dividing the value of the magnetization amount by the sample volume was taken as the saturation magnetization amount Ms. Note that when obtaining that value, a measurement value by a sample rod and a base film was measured in advance and a value obtained by subtracting the measured value as a background value was used (hereinafter, referred to as background correction).

(2) α

The M-H loop in the case where the maximum applied magnetic field was 15,000 Oe was obtained using a vibrating sample magnetometer (VSM), the background correction was performed, and then, the slope (dM/dH) of the M-H loop in the magnetic field (so-called coercive force Hc) where the magnetization amount was zero in the + direction was taken as α.

(3) Coercive Force Hc

The M-H loop in the case where the maximum applied magnetic field was 15,000 Oe was obtained using a vibrating sample magnetometer (VSM), the background correction was performed, and then, the average value of absolute values of the magnetic fields where the magnetization amounts were zero in the + direction and the − direction was taken as the coercive force Hc.

(4) Squareness Ratio Rs

The magnetization amount in the case where the external magnetic field of 15,000 Oe was applied and then the external magnetic field was set to zero was obtained using a vibrating sample magnetometer (VSM), the background correction was performed, and then, the value was divided by the sample volume and the obtained value was taken as a residual magnetization amount Mr. This value was divided by the saturation magnetization amount Ms, and the obtained value in terms of percentage (%) was taken as a squareness ratio Rs.

(5) SNR

A reproduction signal of the magnetic tape was acquired using a loop tester (manufactured by Microphysics, Inc.). The conditions for acquiring the reproduction signal are shown below.

Writer: Ring Type head
Reader: GMR head
Speed: 2 m/s
Signal: Single recording frequency (300 kfci)
Recoding current: Optimal recording current The recording wavelength was set to 300 kFCI (kilo Flux Changes per Inch), and SNR was obtained by the calculation of the ratio of the voltage of the reproduced waveform and the voltage obtained from the value obtained by integrating the noise spectrum in the spectrum band of 0 kFCI to 600 kFCI. The width of the reader used in this evaluation is 2.0 μm, but the width of the reader is presumably approximately 0.5 μm in the case of the magnetic tape to which the present technology is to be applied. The SNR evaluated by the latter reader is calculated to be 6 dB lower than the SNR evaluated in the former reader. In the above-mentioned measurement method, so-called broad-band SNR (BB-SNR), generally, the minimum SNR required to establish a recording/reproduction system is 17 dB in the case where it is assumed to be used at the product level. Therefore, in this evaluation, "23 dB (=17 dB+6 dB) or more" was determined to be a favorable SNR level.

The evaluation results are shown in the following "Table 2".

TABLE 2

| | Evaluation item | | | | |
|---|---|---|---|---|---|
| | Ms (emu/cc) | α | Hc (Oe) | Squareness ratio (%) | BBSNR (dB) |
| Example 1 | 550 | 1.6 | 2200 | 92 | 24 |
| Example 2 | 550 | 1.6 | 2200 | 92 | 24 |
| Example 3 | 550 | 1.6 | 2200 | 92 | 24 |
| Example 4 | 550 | 1.5 | 2100 | 90 | 23 |
| Example 5 | 550 | 1.6 | 2200 | 92 | 24 |
| Example 6 | 550 | 1.6 | 2300 | 94 | 25 |
| Example 7 | 550 | 1.6 | 2400 | 95 | 25 |
| Example 8 | 550 | 1.5 | 3000 | 97 | 23 |
| Example 9 | 550 | 1.5 | 2600 | 95 | 25 |
| Example 10 | 550 | 1.5 | 2500 | 93 | 24 |
| Example 11 | 550 | 1.4 | 2000 | 90 | 24 |
| Example 12 | 550 | 1.4 | 2100 | 93 | 25 |
| Example 13 | 550 | 1.5 | 2200 | 94 | 25 |
| Example 14 | 550 | 1.5 | 2200 | 94 | 25 |
| Example 15 | 550 | 1.4 | 2100 | 90 | 24 |
| Example 16 | 550 | 1.3 | 2200 | 90 | 23 |
| Example 17 | 550 | 1.6 | 2400 | 94 | 25 |
| Example 18 | 550 | 1.5 | 2400 | 94 | 26 |
| Example 19 | 550 | 1.8 | 2500 | 93 | 24 |
| Example 20 | 550 | 1.8 | 2000 | 90 | 24 |
| Example 21 | 550 | 1.6 | 2200 | 92 | 24 |
| Comparative Example 1 | 550 | 1.5 | 1700 | 70 | 20 |
| Comparative Example 2 | 550 | 1.5 | 1900 | 80 | 21 |
| Comparative Example 3 | 550 | 1.5 | 1900 | 80 | 21 |
| Comparative Example 4 | 550 | 1.4 | 1700 | 70 | 20 |
| Comparative Example 5 | 550 | 1.9 | 1900 | 80 | 21 |
| Comparative Example 6 | 550 | 1.2 | 1700 | 70 | 20 |
| Comparative Example 7 | 550 | 1.9 | 1900 | 80 | 21 |
| Comparative Example 8 | 550 | 1.2 | 1700 | 70 | 20 |
| Comparative Example 9 | 550 | 1.3 | 1800 | 70 | 20 |
| Comparative Example 10 | 550 | 1.1 | 1400 | 60 | 19 |

Consideration. As can be seen from the content shown in the above-mentioned "Table 1" and "Table 2", the SNRs of the magnetic recording tapes according to Examples 1 to 21 were all 23 dB or more and favorable. In general, the minimum SNR required to establish a recording/reproduction system is approximately 15 dB in terms of the SNR (so-called digital SNR) after waveform equalization and error correction. Note that in the magnetic tapes according to the Examples, it is possible to realize the areal recording density of 600 kBPI×169 kTPI=101 Gb/in$^2$ assuming that the linear recording density is 600 kBPI (Bit Per Inch), the track pit is twice the track width of the reproduction head, and the track density is 169 kTPI (Tracks Per Inch).

Further, the coercive forces (perpendicular coercive forces) Hc in Examples 1 to 21 were all 2,000 Oe or more, and excellent magnetic properties were achieved. On the other hand, in all the Comparative Examples 1 to 10, the coercive force Hc was less than 2,000 Oe and the force of holding the magnetic force was weak, resulting in poor magnetic properties. As described above, the coercive force of the magnetic recording tape according to the present technology can be favorably 2,000 Oe or more or favorably exceed 2,000 Oe, and can be more favorably 2,100 Oe or more.

Further, regarding the squareness ratio, the magnetic recording tapes according to all Examples 1 to 21 were magnetic recording tapes that had the squareness ratios of 90% or more and excellent magnetic properties, and were capable of efficiently performing recording. On the other hand, in all Comparative Examples 1 to 10, the squareness ratio was less than 90% and the magnetic properties were poor. As described above, the squareness ratio of the magnetic recording tape according to the present technology can be favorably 90% or more.

As described above, it was found that Examples of the magnetic recording tapes according to the present technology had excellent magnetic properties and exhibit favorable SNRs as compared with Comparative Examples.

REFERENCE SIGNS LIST 1 magnetic layer
2 intermediate layer
3 underlayer
31 lower underlayer
32 upper underlayer
4 seed layer
41 lower seed layer
42 upper seed layer
5 base layer
6 back layer
7 soft magnetic underlayer (SUL)
8 magnetic recording tape cartridge
81 cartridge case
82 reel
P protective layer
L lubricant layer

The invention claimed is:

1. A magnetic recording tape, comprising:
    a base layer that includes a long film having flexibility; and
    a magnetic layer on a side of one main surface of the base layer, wherein
        an underlayer and a seed layer are in order from a side of the magnetic layer toward a side of the base layer between the magnetic layer and the base layer,
        the underlayer is a two-layer structure that includes an upper underlayer and a lower underlayer,
        each of the upper underlayer and the lower underlayer contains Co and Cr, and has an average atomic number ratio represented by $Co_{(100-y)}Cr_y$, wherein y is within a range of $37 \leq y \leq 45$,
        a thickness of the upper underlayer is equal to a thickness of the lower underlayer,
        the seed layer on the base layer has a film thickness of 5 nm to 30 nm, and
        the seed layer contains one of:
            Ti and O and ha; at an average atomic number ratio represented by $Ti_{(100-x)}O_x$, wherein $x \leq 10$, or
            Ti—Cr—O at an average atomic number ratio represented by $(TiCr)_{(100-x)}O_x$, wherein $x \leq 10$.

2. The magnetic recording tape according to claim 1, wherein each of the upper underlayer and the lower underlayer further contains a metal oxide.

3. The magnetic recording tape according to claim 2, wherein the metal oxide is one of SiO2 or TiO2.

4. The magnetic recording tape according to claim 1, wherein
    an intermediate layer that contains ruthenium is between the underlayer and the magnetic layer, and
    the intermediate layer has a thickness of 0.5 to 6.0 nm.

5. The magnetic recording tape according to claim 1, wherein a squareness ratio of the magnetic recording tape is 90% or more.

6. The magnetic recording tape according to claim 1, wherein a coercive force of the magnetic recording tape is 2,100 Oe or more.

7. The magnetic recording tape according to claim 1, wherein the magnetic layer is a perpendicularly oriented magnetic layer.

8. The magnetic recording tape according to claim 7, wherein the magnetic layer has a granular structure in which an oxide separates particles containing Co, Pt, and Cr.

9. A magnetic recording tape cartridge comprising a configuration in which the magnetic recording tape according to claim 1 is inside a case, wherein the magnetic recording tape is wound on a reel inside the case.

10. The magnetic recording tape according to claim 1, further comprising a soft magnetic underlayer above the base layer, wherein the seed layer is above the soft magnetic underlayer.

11. The magnetic recording tape according to claim 1, wherein the thickness of each of the upper underlayer and the lower underlayer is in a range of 20 nm to 50 nm.

* * * * *